United States Patent
Toyosawa et al.

(10) Patent No.: US 6,663,975 B1
(45) Date of Patent: Dec. 16, 2003

(54) RESIN COMPOSITION AND GASKET MATERIAL

(75) Inventors: Shinichi Toyosawa, Saitama-ken (JP); Youichi Nishimuro, Tokyo (JP); Naruhiko Mashita, Kanagawa-ken (JP); Kunio Machida, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 407 days.

(21) Appl. No.: 09/671,170

(22) Filed: Sep. 28, 2000

(30) Foreign Application Priority Data

| Nov. 16, 1999 | (JP) | .................................... | 11-325514 |
| Nov. 16, 1999 | (JP) | .................................... | 11-325515 |
| Jan. 14, 2000 | (JP) | .................................... | 2000/005472 |
| Jan. 14, 2000 | (JP) | .................................... | 2000/005473 |

(51) Int. Cl.$^7$ ............................ B32B 15/08; C08L 9/06; C08L 25/08
(52) U.S. Cl. ........................ 428/462; 428/457; 428/461; 525/50; 525/55; 525/190
(58) Field of Search ................................. 428/457, 461, 428/462; 525/74, 190, 55, 50

(56) References Cited

U.S. PATENT DOCUMENTS

| 4,171,601 A | * | 10/1979 | Gotz ............................. 52/790 |
| 4,820,774 A | * | 4/1989 | Takao et al. ................. 525/208 |
| 5,550,190 A | * | 8/1996 | Hasegawa et al. ......... 525/92 A |
| 5,597,867 A | * | 1/1997 | Tsujimoto et al. ............ 525/74 |
| 6,020,427 A | * | 2/2000 | Abraham et al. ............. 525/67 |

FOREIGN PATENT DOCUMENTS

| JP | 60-086154 | 5/1985 |
| JP | 63-056551 | 3/1988 |
| JP | 63-057661 | 3/1988 |

OTHER PUBLICATIONS

Derwent Abstract, JP 61–243852 A, Oct. 30, 1986.*

* cited by examiner

*Primary Examiner*—Monique R. Jackson
(74) *Attorney, Agent, or Firm*—Oblon, Spivak, McClelland, Maier & Neustadt, P.C.

(57) ABSTRACT

There are disclosed a resin composition (I) which comprises 100 parts by weight of (a1) a styrenic thermoplastic elastomer composed of a block copolymer (styrene-ethylene/butylene-styrene block copolymer, styrene-ethylene/propylenestyrene block copolymer), 3 to 50 parts by weight of (b1) an ethylene/(meth) acrylic acid copolymer or an ethylene/(meth)-acrylic ester copolymer each having 5 to 45% by weight of (meth)acrylic acid content, and 50 to 170 parts by weight of (c1) a paraffin base oil; a resin composition (II) which comprises 100 parts by weight of (a2) a styrenic thermoplastic elastomer composed of a block copolymer, 1 to 15 parts by weight of (b2) a maleic anhydride-grafted polyolefin, and 30 to 170 parts by weight of (c2) a paraffin base oil; a gasket material (I) composed of the components (a1), (b1) and (c1); a gasket material (II) composed of the components (a2), (b2) and (c2); and a gasketed cover in which a gasket made of the gasket material (I) or (II) is integrally fitted to a cover body made of a metal by injection molding.

11 Claims, 1 Drawing Sheet

RESIN COMPOSITION AND GASKET MATERIAL

BACKGROUND OF THE INVENTION

1. Field of the Invention

The present invention relates to a resin composition which can be adhered directly to a metal by means of injection molding without the use of any adhesive, can be preferably used as a material for a variety of composite products, and has favorable adhesivity. The present invention relates also to a gasket material which can be adhered directly to a metallic cover body and the like by means of injection molding without the use of any adhesive, and has favorable adhesivity to a cover body and the like.

2. Description of the Related Arts

An elastomer having a low hardness is in a wide range of demand as a gasket material for hard disc units, an ink sealing material and the like, and is advantageous in that when being integrated with a metallic member into a composite product, the characteristics of its own are sufficiently exhibited. In particular, an elastomer having a low hardness is widely used as a gasket material for hard disc units, and is advantageous in that the characteristics of its own are sufficiently exhibited, when it is used in the form of a gasketed cover or a gasket fitted to a frame by integrating with a metallic cover body or a metallic frame body.

In order to integrate an elastomer having a low hardness with a metal, there have heretofore been adopted such methods as ① the use of an adhesive, ② the use of an acid-modified styrenic thermoplastic elastomer as an elastomer having a low hardness, ③ physical integration of a metal and an elastomer having a low hardness by the working of the metal, and the like methods.

However, the above-mentioned method ① is involved in the problems that it necessitates a coating step for an adhesive, it requires process control for coating and drying of the adhesive, thus making it troublesome, and besides the adhesive generates impurities such as a volatile matter. Moreover, the above-mentioned method ② is involved in the problems that because of the polymer being modified, the elastomer having a low hardness is deteriorated in various physical properties, especially compression set, and further the modification is accompanied by the generation of such impurities as residual catalyst and unreacted substances. In addition, the above-mentioned method ③ is involved in the problems that metal working is troublesome, and it is impossible to carry out integration work of a fine part item, thereby disenabling a metal and the elastomer having a low hardness to be integrated with each other.

SUMMARY OF THE INVENTION

Under such circumstances, it is a general object of the present invention to provide a resin composition which can be adhered directly to a metal by means of injection molding without the use of any adhesive, and which is well suited as a material for a variety of composite products.

It is another object of the present invention to provide a gasket material which can be adhered directly to a metal by means of injection molding without the use of any adhesive.

In view of the foregoing, intensive extensive research and investigation were accumulated by the present inventors in order to achieve the above-mentioned objects. As a result, it has been found that the general object can been achieved by using a resin composition (I) wherein a styrenic thermoplastic elastomer composed of a block copolymer is blended with a specific ethylene/(meth)acrylic acid copolymer or an ethylene/(meth) acrylic ester copolymer and a paraffin base oil each in a specific amount.

In addition, it has been found that the another object can been achieved by using a gasket material (I) wherein a styrenic thermoplastic elastomer composed of a block copolymer is blended with a specific ethylene/(meth)acrylic acid copolymer or an ethylene/(meth) acrylic ester copolymer and a paraffin base oil each in a specific amount.

Further, it has been found that the general object can also been achieved by using a resin composition (II) wherein a styrenic thermoplastic elastomer composed of a block copolymer is blended with a maleic anhydride-grafted polyolefin and a paraffin base oil each in a specific amount.

Furthermore, it has been found that the another object can also been achieved by using a gasket material (II) wherein a styrenic thermoplastic elastomer composed of a block copolymer is blended with a maleic anhydride-grafted polyolefin and a paraffin base oil each in a specific amount.

It being so, the present invention has been accomplished on the basis of the above-mentioned findings and information.

Specifically, the present invention provides a resin composition (I) which comprises 100 parts by weight of (a1) a styrenic thermoplastic elastomer composed of a block copolymer; 3 to 50 parts by weight of (b1) an ethylene/(meth)-acrylic acid copolymer or an ethylene/(meth)acrylic ester copolymer each having 5 to 45% by weight of (meth)-acrylic acid content; and 50 to 170 parts by weight of (c1) a paraffin base oil.

In addition, the present invention provides a gasket material (I) which comprises 100 parts by weight of (a1) a styrenic thermoplastic elastomer composed of a block copolymer; 3 to 50 parts by weight of (b1) an ethylene/(meth)-acrylic acid copolymer or an ethylene/(meth)acrylic ester copolymer each having 5 to 45% by weight of (meth) acrylic acid content; and 50 to 170 parts by weight of (c1) a paraffin base oil.

Moreover, the present invention provides a gasketed cover in which a gasket is fitted to a cover body, characterized in that the cover body is made of a metal, the gasket is made of the aforesaid gasket material (I), and said cover body and said gasket are integrated with each other.

Further, the present invention provides a resin composition (II) which comprises 100 parts by weight of (a2) a styrenic thermoplastic elastomer composed of a block copolymer; 1 to 15 parts by weight of (b2) a maleic anhydride-grafted polyolefin; and 30 to 170 parts by weight of (c2) a paraffin base oil.

Still further, the present invention provides a gasket material (II) which comprises 100 parts by weight of (a2) a styrenic thermoplastic elastomer composed of a block copolymer; 1 to 15 parts by weight of (b2) a maleic anhydride-grafted polyolefin; and 30 to 170 parts by weight of (c2) a paraffin base oil.

Furthermore, the present invention provides a gasketed cover in which a gasket is fitted to a cover body, characterized in that the cover body is made of a metal, the gasket is made of the aforesaid gasket material (II), and said cover body and said gasket are integrated with each other.

DESCRIPTION OF THE PREFERRED EMBODIMENTS

Figure 1:
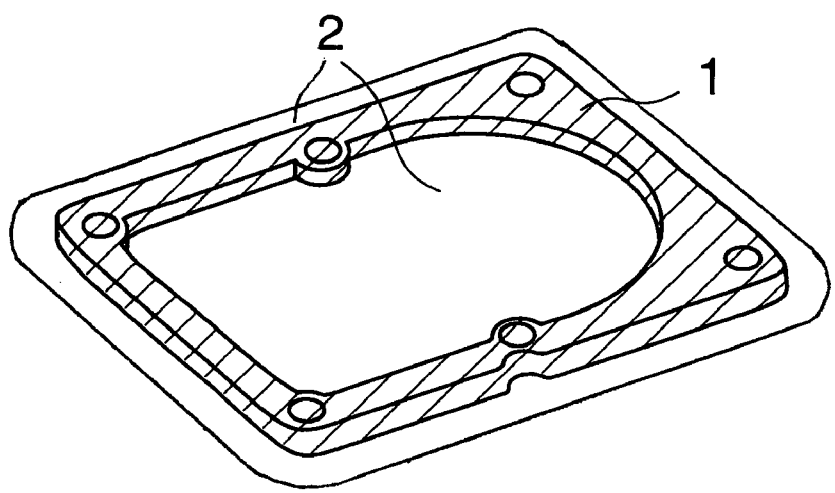
FIG. 1 is a perspective illustration showing a gasketed cover in which use is made of the gasket material according to the present invention and which is viewed from the sealing side.

As the component (a1) in the resin composition (I) and the gasket material (I) according to the present invention, use is made of a styrenic thermoplastic elastomer composed of a block copolymer, which is specifically exemplified by:

① Block copolymer of crystalline polyethylene and ethylene/butylene styrene random copolymer, said block copolymer being obtained by hydrogenating block copolymer of polybutadiene and butadiene-styrene random copolymer; and ② A-B-A type copolymer such as block copolymer of polybutadiene and polystyrene, block copolymer of polyisoprene and polystyrene, diblock copolymer of crystalline polyethylene and polystyrene, said diblock copolymer being obtained by hydrogenating block copolymer of polybutadiene or ethylene-butadiene random copolymer and polystyrene, triblock copolymer (SEBS) of styrene-ethylene/butylene-styrene, and triblock copolymer (SEPS) of styrene-ethylene/propylene-styrene, in particular, block copolymer of styrene-ethylene/butylene-styrene, and block copolymer of styrene-ethylene/propylenestyrene. Any one of the above-exemplified thermoplastic elastomers may be used alone or in combination with at least one other elastomer mentioned above.

As the component (b1) in the resin composition (I) and the gasket material (I) according to the present invention, use is made of an ethylene/(meth)acrylic acid copolymer or an ethylene/(meth)acrylic ester copolymer each having 5 to 45% by weight of (meth) acrylic acid content. The "(meth) acrylic acid" as used herein means acrylic acid or methacrylic acid. In the case of ethylene/(meth)acrylic ester copolymer, the (meth) acrylic acid content is obtained by converting the (meth)acrylic ester to (meth)acrylic acid. The (meth)acrylic acid content of the ethylene/(meth) acrylic acid copolymer or the ethylene/(meth)acrylic ester copolymer, when being less than 5% by weight, causes deterioration in the adhesivity of the resin composition, whereas said content, when being more than 45% by weight, brings about deterioration in the flexibility and heat resistance of the resin composition.

The (meth) acrylic acid content of the ethylene/(meth) acrylic acid copolymer is preferably 5 to 20% by weight, particularly preferably 8 to 18% by weight. In addition, the (meth)acrylic acid content of the ethylene/(meth)acrylic ester copolymer is preferably 25 to 45% by weight, particularly preferably 28 to 40% by weight.

An preferable example of the (meth)acrylic ester in the (meth)acrylic ester copolymer is an alkyl ester having 1 to 10 carbon atoms, which is specifically exemplified by methyl acrylate, ethyl acrylate, isobutyl acrylate, n-butyl acrylate, isooctyl acrylate, 2-ethylhexyl acrylate and methyl methacrylate. An particularly preferable example of the aforesaid copolymer in the resin composition according to the present invention is a copolymer of an acrylic ester having 1 to 4 carbon atoms.

The above-mentioned ethylene/(meth)acrylic acid copolymers or the ethylene/(meth)acrylic ester copolymer in the resin compositions according to the present invention has an MFR (melt flow rate) at a temperature of 190° C. at a load of 2.16 kgf (21.2 N) being in the range of preferably 0.1 to 50 g/10 minutes, particularly preferably 0.5 to 30 g/10 minutes. In the case of the ethylene/(meth)acrylic ester copolymer, it has an MFR at 190° C. at a load of 2.16 kgf being in the range of preferably 1 to 30 g/10 minutes, particularly preferably 5 to 25 g/10 minutes. The aforesaid MFR is measured in accordance with JIS (Japanese Industrial Standard) K7210.

The blending amount of the component (b1) is in the range of 3 to 50 parts by weight, preferably 4 to 40 parts by weight based on 100 parts by weight of the styrenic thermoplastic elastomer as the component (a1). The blending amount of the component (b1), when being less than 3 parts by weight, causes deterioration in the adhesivity of the resin composition, whereas said amount, when being more than 50% by weight, brings about deterioration in the compression set and heat resistance of the resin composition and increased hardness thereof.

The paraffin base oil as the component (c1) in the resin composition (I) and the gasket material (I) according to the present invention is blended for the purpose of lowering the hardness of the resin composition. The blending amount of the component (c1) is in the range of 50 to 170 parts by weight, preferably 60 to 150 parts by weight based on 100 parts by weight of the styrenic thermoplastic elastomer as the component (a1). The blending amount of the component (c1), when being less than 50 parts by weight, results in failure to attain sufficient low hardness of the resin composition as well as insufficient flexibility of the injection molded article, whereas the blending amount thereof, when being more than 170 parts by weight, brings about a cause for the deterioration in the mechanical strength of the injection molded article.

The above-mentioned paraffin base oil as the component (c1) has a kinematic viscosity at 40° C. of at least 100 mm$^2$/sec, preferably in the range of 100 to 10000 mm$^2$/sec, particularly preferably in the range of 200 to 5000 mm$^2$/sec. Preferably, the above-mentioned paraffin base oil has a weight-average molecular weight in the range of 450 to 5000.

As the component (a2) in the resin composition (II) and the gasket material (II) according to the present invention, use is made of the styrenic thermoplastic elastomer composed of a block copolymer same as that in the component (a1) in the resin composition (I) and the gasket material (I).

As the component (b2) in the resin composition (II) and the gasket material (II) according to the present invention, use is made of a maleic anhydride-grafted polyolefin. The degree of modification by maleic acid in the graft of the maleic anhydride-grafted polyolefin is preferably in the range of 3 to 15%, particularly preferably in the range of 4 to 12%. The degree of modification by maleic acid (%) is a value calculated by the formula: {(molecular weight of maleic acid moiety in the graft)/(total molecular weight of maleic acid)}×100%. The degree of modification by maleic acid, when being less than 3%, causes a fear of failure to assure sufficient adhesivity to a metal at the time of injection molding, whereas the degree of modification thereby, when being more than 15%, causes a fear of deterioration in the physical properties of the resin composition (compression set, physical properties at break and the like), thus failing to achieve sufficient characteristics in practical application.

Examples of the maleic anhydride-grafted polyolefin include maleic anhydride-grafted polyethylene, maleic anhydride-grafted polypropylene and maleic anhydride-grafted polybutylene. Of these, maleic anhydride-grafted polypropylene is preferable from the aspect of its high melting point, excellent stability and the like. The polypropylene in the maleic anhydride-grafted polypropylene has a weight-average molecular weight in the range of 10,000 to 150,000, preferably 20,000 to 100,000.

The blending amount of the component (b2) is in the range of 1 to 15 parts by weight, preferably 2 to 13 parts by weight based on 100 parts by weight of the styrenic thermoplastic elastomer as the component (a2). The blending amount of the component (b2), when being less than 1 part by weight, causes deterioration in the adhesivity of the resin composition, whereas said amount, when being more than 15% by weight, brings about deterioration in the compression set and heat resistance of the resin composition and increased hardness thereof.

The paraffin base oil as the component (c2) in the resin composition (II) and the gasket material (II) according to the present invention is blended for the purpose of lowering the hardness of the resin composition. The blending amount of the component (c2) is in the range of 30 to 170 parts by weight, preferably 35 to 160 parts by weight based on 100 parts by weight of the styrenic thermoplastic elastomer as the component (a2). The blending amount of the component (c2) when being less than 30 parts by weight, results in failure to attain sufficient low hardness of the resin composition as well as insufficient flexibility of the injection molded article, whereas said amount, when being more than 170 parts by weight, brings about a cause for the deterioration in the mechanical strength of the injection molded article.

The paraffin base oil as the component (c2) in the resin composition (II) has a kinematic viscosity at 40° C. of at least 100 $mm^2$/sec, preferably in the range of 100 to 10000 $mm^2$/sec, particularly preferably in the range of 200 to 5000 $mm^2$/sec. Preferably, the above-mentioned paraffin base oil has a weight-average molecular weight in the range of 450 to 5000.

No specific limitation is imposed on the processes for producing the resin compositions (I) and (II), and the gasket materials (I) and (II) according to the present invention, and any of well known production processes are applicable thereto. For instance, any of the above-mentioned resin compositions and the gasket materials is readily producible by melt kneading the components (a1) to (c1) or (a2) to (c2) and additive components that are used as desired by the use of a heating kneader such as a single screw extruder, a twin screw extruder, a roll, a Banbury mixer, a prabender, a kneader or a high shear type mixer.

By injection molding the resin composition (I) or (II) which has been obtained in the above-mentioned manner, there is obtainable a composite body in which the molded article of the resin composition and a metal are integrated with each other. In addition, by injection molding the gasket material (I) or (II) which has been obtained in the above-mentioned manner, there is obtainable an integrated gasket in which the gasket and a cover body or a frame body are integrated with each other.

The injection molding of the resin composition (I) or (II) and the gasket material (I) or (II) can be carried out under the conditions in which a mold temperature is 30° C. or higher, preferably in the range of 35 to 85° C., a resin temperature is in the range of 170 to 250° C., preferably 180 to 230° C., and an injection molding rate of 100 to $10^5$ $sec^{-1}$, preferably 1000 to $5 \times 10^4 sec^{-1}$.

The material which constitutes a cover body and a frame body can be properly and optionally selected for use according to the purpose of use of the aforesaid bodies from among nickel-plated aluminum, nickel-plated steel, cold rolled steel sheets, galvanized steel sheets, aluminum/zinc alloy-plated steel, stainless steel, aluminum, aluminum alloys, magnesium, magnesium alloys and the like. There are also usable injection molded magnesium sheets. From the standpoint of corrosion resistance, there are preferably usable metallic sheets that are treated with non-electrolytic nickel plating, especially nickel-plated aluminum and nickel-plated steel in the present invention. As a method for non-electrolytic nickel plating, there can be used a conventional method which has heretofore been applied to metallic raw materials such as a method which comprises immersing a metallic sheet to be treated in a non-electrolytic nickel plating bath consisting of an aqueous solution at a pH of approximately 4.0 to 5.0 at a temperature of approximately 85 to 95° C. which contains, for instance, nickel sulfate, sodium hypochlolite, lactic acid, propionic acid and the like each at a proper proportion.

The gasket materials (I) and (II) according to the present invention can be adhered directly to a metal by means of injection molding without the use of any adhesive, and sufficiently exhibit the working effect thereof when combined with a metal. As a material constituting a cover body and a frame body, a thermoplastic resin is usable. Examples of the thermoplastic resin include acrylonitrile styrene (AS) resin, acrylonitrile butadiene styrene (ABS) resin, styrenic resin such as polystyrene and syndiotactic polystyrene, olefinic resin such as polyethylene and polypropylene, polyamide resin such as nylon, polyester-based resin such as polyethylene terephthalate and polybutylene terephthalate, modified polyphenylene ether, acrylic resin, polyacetal, polycarbonate, a liquid crystal polymer, polyphenylene sulfide (PPS) and the like. The liquid crystal polymer is preferably a thermotropic liquid crystal polymer, which is classified into those of polycarbonate base, polyurethane base, polyamide base, polyester base and the like, respectively.

In the following, the present invention will be described in more detail with reference to working examples, which however shall never be construed to limit the present invention thereto.

EXAMPLE 1

A resin composition was prepared by kneading 100 parts by weight of (1) a styrene-ethylene/propylene-styrene triblock copolymer {manufactured by Kuraray Co.,Ltd. under the trade name "Septon 4077"} having a number-average molecular weight of 280,000 and a styrene unit content of 30% by weight, 40 parts by weight of (2) methacrylic acid-modified polyethylene manufactured by Mitsui Dupont Chemical Co.,Ltd. under the trade name "Neucrel N 1525") having an MFR at a temperature of 190° C. at a load of 2.16 kgf (21.2 N) being 25 g/10 minutes, and 150 parts by weight of (3) a paraffin base oil {manufactured by Idemitsu Koasan Co.,Ltd. under the trade name "Diana Process Oil PW 380"} having a kinematic viscosity at 40° C. of 380 $mm^2$/sec and a weight-average molecular weight of 750. The resultant resin composition had a JIS hardness A of 35 deg.

Subsequently, a composite body was prepared by injection molding the resin composition thus obtained in a thickness of 10 mm onto a metal consisting of a nickel-plated aluminum sheet by the use of an injection molding machine (manufactured by Nissei Plastic Industrial Co., Ltd. under the trade name "DC 60E 5ASE") at a mold temperature of 50° C. at a resin temperature of 210° C. at an injection molding rate of $3 \times 10^4$ $sec^{-1}$. The composite body thus prepared, in which the resin composition and the metal were integrated with each other, was free from any of sink and flash, and had sufficient adhesivity between the resin composition and the metal.

Subsequently, a sample in the form of a sheet was prepared under the injection molding conditions same as in the foregoing. Then a measurement was made of the strain of the aforesaid sample when it was subjected to 25% compression at 70° C. for a period of 22 hours in accordance with JIS K6206. As a result, the compression set was 35%.

EXAMPLE 2

A gasket material was prepared by kneading 100 parts by weight of (1) a styrene-ethylene/propylene-styrene triblock copolymer {manufactured by Kuraray Co.,Ltd. under the trade name "Septon 4077"} having a number-average molecular weight of 280,000 and a styrene unit content of 30% by weight, 40 parts by weight of (2) methacrylic acid modified polyethylene {manufactured by Mitsui Dupont Chemical Co.,Ltd. under the trade name "Neucrel N 1525"} having an MFR at a temperature of 190° C. at a load of 2.16 kgf (21.2 N) being 25 g/10 minutes, and 150 parts by weight of (3) a paraffin base oil {manufactured by Idemitsu Koasan Co.,Ltd. under the trade name "Diana Process Oil PW 380"} having a kinematic viscosity at 40° C. of 380 mm$^2$/sec and a weight-average molecular weight of 750. The resultant gasket material had a JIS hardness A of 35 deg.

Subsequently, a gasketed cover was prepared by injection molding the gasket material thus obtained in a thickness of 0.5 mm and a width of 2.0 mm onto a cover body consisting of a nickel-plated aluminum sheet by the use of an injection molding machine (manufactured by Nissei Plastic Industrial Co.,Ltd. under the trade name "DC 60E 5ASE") at a mold temperature of 50° C. at a resin temperature of 210° C. at an injection molding rate of $3 \times 10^4$ sec$^{-1}$. The resultant gasketed cover as illustrated in FIG. 1, in which the gasket 1 and the cover body 2 were integrated with each other, was free from any of sink and flash, and had sufficient adhesivity between the gasket and the cover body.

Subsequently, a sample in the form of a sheet was prepared under the injection molding conditions same as in the foregoing. Then a measurement was made of the strain of the aforesaid sample when it was subjected to 25% compression at 70° C. for a period of 22 hours in accordance with JIS K6206. As a result, the compression set was 35%

Thereafter, the gasketed cover which had been prepared in the above-mentioned manner was brought into use in a hard disc unit of a computer. As a result, over a long period of time, the gasketed cover was free from the occurrence of trouble or failure attributable to gas generation and besides, maintained satisfactory sealing properties.

EXAMPLE 3

A resin composition was prepared by kneading 100 parts by weight of (1) a styrene-ethylene/propylene-styrene triblock copolymer {manufactured by Kuraray Co.,Ltd. under the trade name "Septon 4077"} having a number-average molecular weight of 280,000 and a styrene unit content of 30% by weight, 8 parts by weight of (2) maleic acid-modified polyethylene {manufactured by Sanyo Chemical Industries Co.,Ltd. under the trade name "Youmex 1001"} having a melt viscosity at a temperature of 160° C. being approximately 16,000 mPa.s, and 120 parts by weight of (3) a paraffin base oil {manufactured by Idemitsu Koasan Co., Ltd. under the trade name "Diana Process Oil PW p380"} having a kinematic viscosity at 40° C. of 380 mm$^2$/sec and a weight-average molecular weight of 750. The resultant resin composition had a JIS hardness A of 26 deg.

Subsequently, a composite body was prepared by injection molding the resin composition thus obtained in a thickness of 10 mm onto a metal consisting of a nickel-plated aluminum sheet by the use of an injection molding machine (manufactured by Nissei Plastic Industrial Co.,Ltd. under the trade name "DC 60E 5ASE") at a mold temperature of 50° C. at a resin temperature of 210° C. at an injection molding rate of $3 \times 10^4$ sec$^{-1}$. The composite body thus prepared, in which the resin composition and the metal were integrated with each other, was free from any of sink and flash, and had sufficient adhesivity between the resin composition and the metal.

Subsequently, a sample in the form of a sheet was prepared under the injection molding conditions same as in the foregoing. Then a measurement was made of the strain of the aforesaid sample when it was subjected to 25% compression at 70° C. for a period of 22 hours in accordance with JIS K6206. As a result, the compression set was 30%.

EXAMPLE 4

A resin composition was prepared by kneading 100 parts by weight of (1) a styrene-ethylene/propylene-styrene triblock copolymer {manufactured by Kuraray Co.,Ltd. under the trade name "Septon 4077"} having a number-average molecular weight of 280,000 and a styrene unit content of 30% by weight, 8 parts by weight of (2) maleic acid-modified polyethylene {manufactured by Sanyo Chemical Industries Co.,Ltd. under the trade name "Youmex 1001"} having a melt viscosity at a temperature of 160° C. being approximately 16,000 mPa.s, and 120 parts by weight of (3) a paraffin base oil {manufactured by Idemitsu Koasan Co., Ltd. under the trade name "Diana Process Oil PW 380"} having a kinematic viscosity at 40° C. of 380 mm$^2$/sec and a weight-average molecular weight of 750. The resultant gasket material had a JIS hardness A of 26 deg.

Subsequently, a gasketed cover was prepared by injection molding the gasket material thus obtained in a thickness of 0.5 mm and a width of 2.0 mm onto a cover body consisting of a nickel-plated aluminum sheet by the use of an injection molding machine (manufactured by Nissei Plastic Industrial Co.,Ltd. under the trade name "DC 60E 5ASE") at a mold temperature of 50° C. at a resin temperature of 210° C. at an injection molding rate of $3 \times 10^4$ sec$^{-1}$. The resultant gasketed cover as illustrated in FIG. 1, in which the gasket 1 and the cover body 2 were integrated with each other, was free from any of sink and flash, and had sufficient adhesivity between the gasket and the cover body.

Subsequently, a sample in the form of a sheet was prepared under the injection molding conditions same as in the foregoing. Then a measurement was made of the strain of the aforesaid sample when it was subjected to 25% compression at 70° C. for a period of 22 hours in accordance with JIS K6206. As a result, the compression set was 30%

Thereafter, the gasketed-cover which had been prepared in the above-mentioned manner was brought into use in a hard disc unit of a computer. As a result, over a long period of time, the gasketed cover was free from the occurrence of trouble or failure attributable to gas generation and besides, maintained satisfactory sealing properties.

What is claimed is:

1. A resin composition which consists essentially of 100 parts by weight of (a) a styrenic thermoplastic elastomer comprising a block copolymer; 3 to 50 parts by weight of (b) an ethylene/(meth)acrylic acid copolymer having 5 to 45% by weight of (meth)acrylic acid content; and 50 to 170 parts by weight of (c) a paraffin base oil, wherein the block copolymer is at least one member selected from the group consisting of styrene-ethylene/butylene-styrene block copolymer and styrene-ethylene/propylene-styrene block copolymer.

2. The resin composition according to claim 1, wherein the ethylene/(meth)acrylic acid copolymer has 5 to 20% by weight of (meth)acrylic acid content.

3. The resin composition of claim 1, wherein the styrenic thermoplastic elastomer is obtained by hydrogenating a block copolymer containing polymerized units of butadiene and styrene.

4. The resin composition of claim 1, wherein the (meth) acrylic acid copolymer comprises from 8 to 18% by weight of (meth)acrylic acid.

5. A gasket material which consists essentially of 100 parts by weight of (a) a styrenic thermoplastic elastomer comprising a block copolymer; 3 to 50 parts by weight of (b) an ethylene/(meth)acrylic acid copolymer having 5 to 45% by weight of (meth)acrylic acid content; and 50 to 170 parts by weight of (c) a paraffin base oil, wherein the block copolymer is at least one member selected from the group consisting of styrene-ethylene/butylene-styrene block copolymer and styrene-ethylene/propylene-styrene block copolymer.

6. The gasket material according to claim 5, wherein the ethylene/(meth)acrylic acid copolymer has 5 to 20% by weight of (meth)acrylic acid content.

7. The gasket material of claim 5, wherein the styrenic thermoplastic elastomer is obtained by hydrogenating a block copolymer containing polymerized units of butadiene and styrene.

8. The gasket material of claim 5, wherein the (meth) acrylic acid copolymer comprises from 8 to 18% by weight of (meth)acrylic acid.

9. A gasketed cover comprising a gasket and a cover body, wherein the gasket is fitted to the cover body, and further wherein the cover body is made of a metal, the gasket is made of the gasket material as set forth in claim 5, and said cover body and said gasket are integrated with each other.

10. The gasketed cover according to claim 9, wherein the gasket and the cover body are integrated with each other by injection molding of the gasket material.

11. The gasketed cover according to claim 9, wherein the cover body comprises nickel-plated aluminum or nickel-plated steel.

* * * * *